United States Patent
Wey et al.

(10) Patent No.: US 7,633,431 B1
(45) Date of Patent: Dec. 15, 2009

(54) ALIGNMENT CORRECTION ENGINE

(75) Inventors: Terrence P. Wey, Cedar Rapids, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 114 days.

(21) Appl. No.: 11/436,367

(22) Filed: May 18, 2006

(51) Int. Cl.
*G01S 13/00* (2006.01)
*G01S 7/40* (2006.01)

(52) U.S. Cl. ............................. 342/75; 342/67; 342/74; 342/165

(58) Field of Classification Search ............... 342/26 A, 342/26 B, 26 C, 26 D, 26 R, 33, 34, 35, 52, 342/54, 61, 62, 63, 66, 73–103, 67, 74, 75, 342/165; 367/16; 343/705, 708, 711, 754, 343/757
See application file for complete search history.

(56) References Cited

U.S. PATENT DOCUMENTS

| | | | |
|---|---|---|---|
| 3,666,887 A * | 5/1972 | Freeman | 348/115 |
| 3,797,014 A * | 3/1974 | Tompkins et al. | 342/90 |
| 3,821,738 A * | 6/1974 | Quesinberry et al. | 342/77 |
| 3,935,572 A * | 1/1976 | Broniwitz et al. | 342/80 |
| 4,224,507 A * | 9/1980 | Gendreu | 235/412 |
| 4,665,401 A * | 5/1987 | Garrard et al. | 342/75 |
| 4,929,952 A * | 5/1990 | Schneider et al. | 342/184 |
| 5,198,819 A | 3/1993 | Susnjara | |
| 5,202,695 A * | 4/1993 | Hollandsworth et al. | 342/359 |
| 5,442,364 A * | 8/1995 | Lee et al. | 342/372 |
| 5,485,156 A * | 1/1996 | Manseur et al. | 342/77 |
| 5,574,461 A * | 11/1996 | Withag et al. | 342/67 |
| 5,945,926 A | 8/1999 | Ammar et al. | |
| 6,018,307 A * | 1/2000 | Wakayama et al. | 342/26 D |
| 6,683,557 B2 * | 1/2004 | Pleva et al. | 342/74 |
| 6,812,883 B2 * | 11/2004 | Kumon et al. | 342/70 |
| 6,831,591 B2 * | 12/2004 | Horibe | 342/52 |
| 7,079,073 B2 * | 7/2006 | Fujita | 342/174 |
| 2003/0184471 A1 * | 10/2003 | Tohyama et al. | 342/175 |
| 2004/0257261 A1 | 12/2004 | Agler | |
| 2006/0077093 A1 | 4/2006 | Steinbauer | |

\* cited by examiner

*Primary Examiner*—Thomas H Tarcza
*Assistant Examiner*—Peter M Bythrow
(74) *Attorney, Agent, or Firm*—Daniel M. Barbieri

(57) ABSTRACT

A method for determining an adjusted position of a component of an aerial vehicle in response to a situational parameter is provided. The system includes a component mounted on an aerial vehicle, a control system operably coupled to the component, and a processor operably coupled to the control system. The control system adjusts a position of the component based on commands received from the processor. The processor receives positional data and a situational datum relating to the vehicle. The positional data is determined as a function of a situational parameter of the vehicle and is stored in a memory accessible by the processor. The processor determines an adjustment to the position of the component using the situational datum and the positional data and sends the determined adjustment to the control system.

20 Claims, 3 Drawing Sheets

ALIGNMENT CORRECTION ENGINE

BACKGROUND OF THE INVENTION

The present application relates generally to correcting an alignment of a system of an aerial vehicle. For example, the present application relates to a method of and a system for aligning one or more components of a radar system, a heads-up display, an instrument landing system, a laser designation system, etc. mounted on an aerial vehicle.

For example, a radar system mounted on an aerial vehicle may be used to search a volume of space or ground for objects, to track detected objects that are moving, to identify certain types of objects, or to create an image of selected objects. Diverse types of objects include weather phenomena, moving objects such as cars, trucks, aircraft, missiles, satellites, fixed objects, etc. The quality of the data obtained from a radar system, as well as other aircraft systems utilizing orientation information, is generally related to the accuracy of the knowledge of the orientation of portions of the system's components such as a radar antenna(s) location and orientation in space particularly when the antenna is located on a moving platform. Thus, to provide the most effective radar operation, the radar antenna should be positioned at a known location and orientation with respect to the platform such as an aerial vehicle. Typically, a boresight of the radar antenna is defined relative to a radar antenna coordinate reference frame that is aligned with an Earth coordinate reference frame so that the antenna's location and orientation can be determined based on the movement and rotation of the moving platform.

Systems such as radar antennas can be commanded to steer electronically or mechanically in azimuth and elevation. For example, aircraft mounted weather radar systems use automatic antenna tilt control to command antenna azimuth scans at desired elevation angles relative to the horizon of the weather radar system. Additionally aircraft mounted weather radar systems can be commanded to scan in elevation. Using mechanical or electrical steering, the boresight of the radar antenna is moved to specific locations defined in the radar antenna coordinate reference frame. As a scan occurs, the aircraft orientation can change. The radar system can respond to the aircraft orientation change by receiving an indication of the aircraft orientation from sensors or other aircraft equipment. The radar system uses the received indication of the aircraft orientation to correct the antenna position, for example, so that the azimuth scan occurs across the horizon at a fixed elevation regardless of the aircraft orientation. Other systems, such as an instrument landing system, may not be steered, but their output data may require either some multiplicative or additive error correction based on an indication of the aircraft orientation.

Many factors can contribute to antenna alignment errors resulting from a deviation between a desired boresight angle and an actual boresight angle. For example, some errors arise during installation and mounting of the hardware. Installation and mounting errors tend to be relatively constant. As a result, after detection, constant errors generally can be removed through calibration. Other alignment errors are more dynamic, but may still arise from a change in aircraft state. A classic example of a systematic, but dynamic error seen on most aircraft is the change that occurs when the weight of the aircraft is supported by the wings instead of the wheels. The fuselage flexes between these two states. A vertical pointing angle of any sensor or instrumentation mounted at or forward of the cockpit changes as the fuselage flexes. Other examples include airframe deformation due to pressurization, uneven heating, and loading. Such airframe deformation alters the expected location and orientation of the antenna in a known and repeatable way. These variations can be said to be systematic.

Various techniques for aligning the antenna have been identified. For example, special test equipment can be used to mechanically align the antenna to the aircraft body coordinate reference frame. Additionally, adjustment of the antenna location and orientation can be performed in response to the observed performance of the radar system or other system being calibrated. For example, the antenna boresight of a radar can be aimed from a known position to a known fixed target position. The actual return from the known fixed target position is analyzed, and the antenna position is adjusted based on the analysis. According to another technique, the antenna can be positioned using optical tools. Other alignment systems may use data generated during normal operation of the sensor or instrumentation being calibrated. Such alignment systems may have difficulty tracking the rapid alignment changes induced by aircraft or environment state changes.

Such prior alignment techniques are time consuming and, in some circumstances, add unnecessary weight to the aircraft. Additionally, these techniques do not respond to dynamic and rapid alignment errors. Thus, there is a need for a system and a method for adjusting the position of an antenna for optimum radar or other such system performance without a need for additional time consuming procedures and without the need for additional mechanical components that add weight to the aircraft. Further still, there is a need for adjusting the position of an antenna to compensate for systematic, dynamic errors associated, for example, with deformation of the airframe.

SUMMARY

An exemplary embodiment provides a method for correcting the alignment of various components mounted on an aerial vehicle quickly and without adding weight to the component. Additionally, the method can compensate for dynamic alignment errors that occur when the platform on which the component is mounted moves. For example, the method compensates for alignment errors that vary as a function of the phase of flight of an aerial vehicle. Positional data is measured based on situational parameters associated with the phase of flight and stored in the aerial vehicle for access by a processor that determines the appropriate component alignment adjustment based on one or more situational datum that relates to the phase of flight. Exemplary systems to utilize the alignment correction engine include a radar system, a HUD system, an instrument landing system, a laser designation system, etc. The alignment correction engine may use situational and/or characteristic data related to the platform on which the system is mounted to determine an adjusted position (location/orientation) for a component of the systems. For example, an antenna orientation may be adjusted.

A system for determining an adjusted position of a component of an aerial vehicle in response to a situational parameter is provided. The system includes, but is not limited to, the component, a control system operably coupled to the component, and a processor operably coupled to the control system. The control system adjusts a position of the component based on commands received from the processor. The processor receives positional data and a situational datum relating to the vehicle. The positional data is determined as a function of a situational parameter of the vehicle and is stored in a memory accessible by the processor. The processor determines an adjustment to the position of the component using the situational datum and the positional data and sends the determined adjustment to the control system.

An exemplary method of determining an adjusted position of a component in response to a situational parameter includes, but is not limited to, receiving a situational datum relating to an aerial vehicle, receiving positional data of a component of the aerial vehicle from a memory, determining an adjustment using the received situational datum and the received positional data, and sending the determined adjustment to a control system to adjust a position of the component. The positional data is defined as a function of a situational parameter of the aerial vehicle, and the situational datum is related to the situational parameter.

Another exemplary embodiment of the invention includes computer-readable instructions that, upon execution by a processor, cause the processor to implement the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
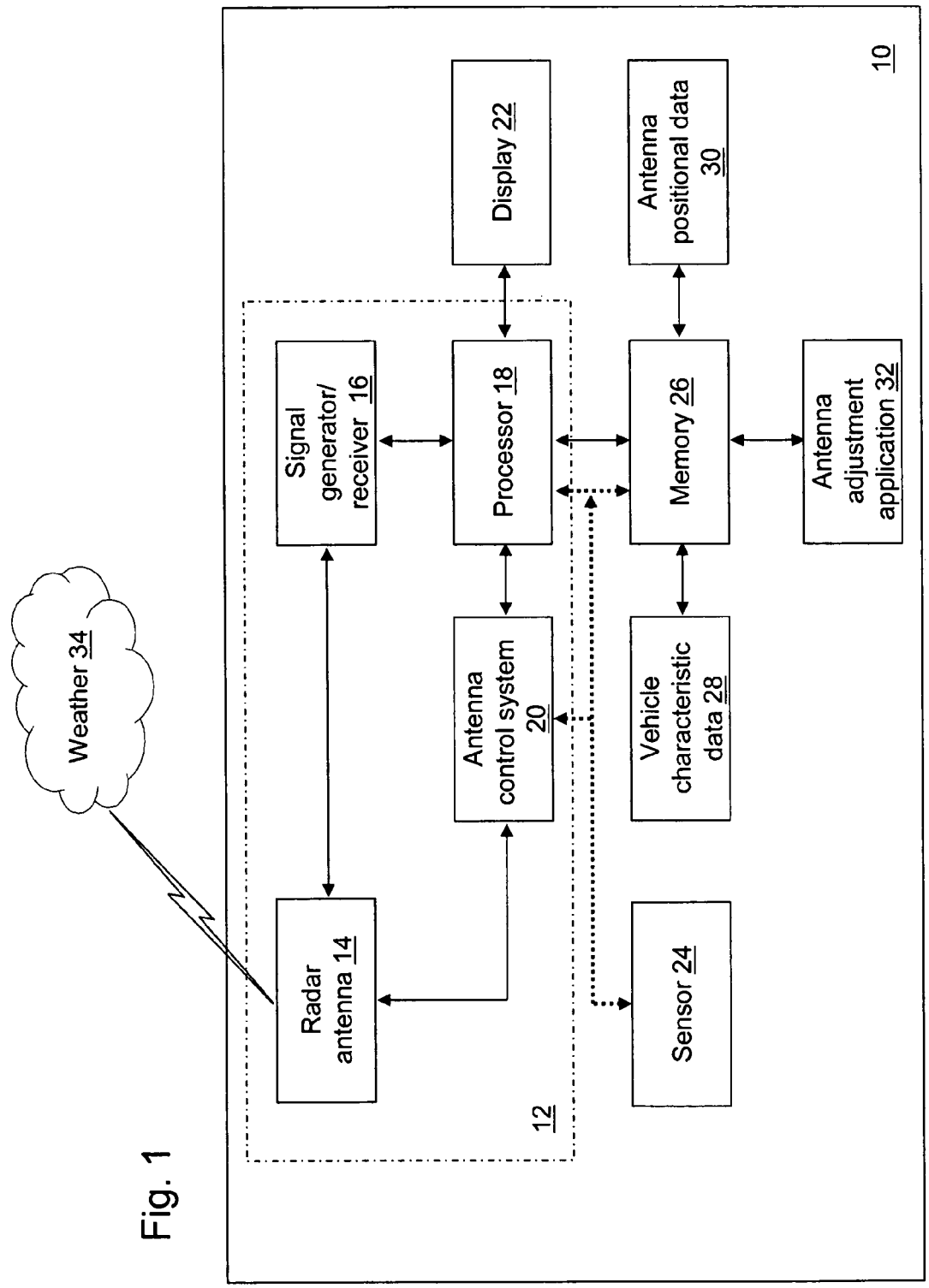
FIG. 1 is a block diagram of an antenna adjustment system in accordance with a first exemplary embodiment.

With reference to FIG. 1, an antenna adjustment system 10 is shown in an exemplary embodiment. Antenna adjustment system 10 may be mounted on an aerial vehicle such as an aircraft, or a satellite, or on any other moving platform. As used herein, the term "mount" includes join, unite, connect, associate, insert, hang, hold, affix, attach, fasten, bind, paste, secure, bolt, screw, rivet, solder, weld, and other like terms. The phrase "mounted on" includes the interior, the exterior, or a surface of the platform referenced. In the exemplary embodiment of FIG. 1, antenna adjustment system 10 is mounted on an aircraft.

Antenna adjustment system 10 includes a radar system 12. Radar system 12 may include a radar antenna 14, a signal generator/receiver 16, a processor 18, and an antenna control system 20. Radar antenna 14 may include one or more antenna element. In an exemplary embodiment, an antenna element is a transducer that converts electromagnetic fields into alternating electric currents and vice-versa. For example, radar antenna 14 may be a single antenna element, separate transmit and receive antenna elements, a phased array antenna, a linear array of antenna elements, etc. A variety of antenna designs may be utilized depending on the application for the radar system. For example, the antenna design may be selected based on the types of objects to be detected, the distance at which detection of the object is desired, the speed, if any, of the object, whether or not an image is formed of the object and/or tracking of the object is performed, etc. as known to those skilled in the art both now and in the future. With reference to the exemplary embodiment of FIG. 1, radar system 12 detects information associated with weather 34.

Signal generator/receiver 16 generates signals that may be appropriately timed and shaped output pulses, discrete frequencies, chirp pulses, etc., as required for the type of radar application. The output signal of signal generator/receiver 16 may be provided through a power amplifier to radar antenna 14 that converts the generated signal to electromagnetic fields. Radar antenna 14 radiates the electromagnetic fields in a direction defined relative to an antenna boresight. An antenna boresight refers to the physical broadside axis of a directional antenna. The radiated energy may be centered about the antenna boresight or may be directed relative to the antenna boresight as in electronic steering of a phased array antenna relative to the antenna boresight. An antenna coordinate reference system is typically defined such that the antenna boresight corresponds to the positive z axis. The antenna coordinate reference system may be defined with respect to a coordinate reference system of the object to which the antenna adjustment system 10 is mounted.

Additionally, a directional coupler may be used depending on the type of antenna system used. In an exemplary embodiment, signal generator/receiver 16 provides detection of a signal and conversion of the detected signal to digitized data, for example by sampling of the received signal. The digitized data may be provided to a digital signal processor within the signal generator/receiver 16 or to processor 18 appropriately programmed to process the digital signal.

Processor 18 executes instructions. The instructions may be carried out by a special purpose computer, logic circuits, or hardware circuits. Thus, processor 18 may be implemented in hardware, firmware, software, or any combination of these methods. The term "execution" is the process of running an application or the carrying out of the operation called for by an instruction. The instructions may be written using one or more programming language, scripting language, assembly language, etc. It is understood that any type of processor that can be programmed to carry out the signal/data processing set forth herein may be utilized. The digital signal may be saved in a memory 26 coupled to the processor as known to those skilled in the art. Processor 18 can receive the digital signal representing the radar return directly or through memory 26. Antenna adjustment system 10 may include a plurality of processors that use the same or a different processing technology.

Antenna control system 20 controls the positioning of radar antenna 14. Antenna control system 20 may be an electronic system or an electro-mechanical system that physically moves radar antenna 14 without limitation. Antenna control system 20 couples to processor 18. Processor 18 provides signals to antenna control system 20 to control the position of radar antenna 14. The position or orientation of radar antenna 14 can be adjusted, for example, with respect to elevation, azimuth, and roll angles that define the location of the antenna boresight. As used herein, positional control of radar antenna 14 includes control of the location of radar antenna 14 and of the orientation of radar antenna 14 with respect to a coordinate reference system. If radar antenna 14 includes a plurality of antenna elements, antenna control system 20 may control the position or orientation of each antenna element individually or as an ensemble.

Antenna adjustment system 10 may further include a display 22. Display 22 presents information to the user of radar system 12 including, but not limited to, information related to radar system 12 such as images of the object detected and information related to the antenna position. Display 22 may be a thin film transistor (TFT) display, a light emitting diode (LED) display, a Liquid Crystal Display (LCD), a Cathode Ray Tube (CRT) display, etc. as known to those skilled in the art both now and in the future. Exemplary images displayed with display 22 include representations of weather regions, rainfall densities, turbulence regions, etc. Antenna adjustment system 10 may include a plurality of displays that use the same or a different display technology. Display 22 can be a multifunction flight display.

Antenna adjustment system 10 may further include a sensor 24. Sensor 24 provides a characterization of the environmental characteristics associated with the platform on which antenna adjustment system 10 is mounted. Antenna adjustment system 10 may include a plurality of sensors that sense, measure, and/or determine situational data related to situational parameters of the platform on which antenna adjustment system 10 is mounted. Situational parameters may include RF spectral characterization data, position, velocity, and acceleration information, atmospheric data, a platform weight, a platform center of gravity, etc. For example, sensor 24 may be an altimeter, a global positioning system, a thermometer, a barometer, a speedometer, a gyroscope, an inertial navigation system, or any combination of sensors. Exemplary situational parameters of the platform include, but are not limited to, a velocity, an altitude, an azimuth angle, a roll angle, an elevation angle, a latitude, a longitude, a weight, a temperature, a pressure, and/or a center of gravity. Additionally, sensor 24 may be a clock that indicates, for example, the time since takeoff of the platform. Weight and center of gravity, for example, may be defined based on the time since takeoff based on an expenditure of fuel.

The situational parameters may be measured in various units and with reference to various coordinate reference systems. For example, the altitude may be a geographic altitude, a geodetic altitude, and/or a local altitude measured based on the local terrain. The velocity may be a ground speed, an airspeed, an inertial speed, etc. Sensor 24 may be coupled to antenna control system 20, processor 18, and/or memory 26 to provide a sensed situational datum. Sensor 24 may provide a situational datum as part of an initialization process, periodically, and/or in real-time.

Antenna adjustment system 10 may further include a memory 26. Antenna adjustment system 10 may have one or more memories 26 that use the same or a different type of memory technology. Memory 26 stores information for access by other elements of antenna adjustment system 10. For example, memory 26 may store sensed situational data from one or more sensors 24, vehicle characteristic data 28 associated with the platform on which antenna adjustment system 10 is mounted, antenna positional data 30, an antenna adjustment application 32, in addition to other information associated with antenna adjustment system 10. Memory technologies include, but are not limited to, random access memory, read only memory, flash memory, etc. and include both volatile and non-volatile storage.

Antenna adjustment system 10 may further include vehicle characteristic data 28. Vehicle characteristic data 28 characterizes the platform on which antenna adjustment system 10 is mounted. For example, vehicle characteristic data 28 may include a vehicle identifier, a vehicle type, and an antenna mounting location indicator. The vehicle identifier may indicate a specific vehicle; whereas the vehicle type may indicate the type of vehicle such as a particular type of aircraft. The antenna mounting location indicator may indicate where radar antenna 14 is mounted on the platform. For example, antenna mounting location indicator may indicate that radar antenna 14 is mounted in the nose of the aircraft as opposed to on the undercarriage of the aircraft.

Antenna adjustment system 10 further includes antenna positional data 30. Antenna positional data 30 includes antenna positional data determined as a function of a situational parameter of the platform on which antenna adjustment system 10 is mounted. For example, antenna positional data 30 may be a single or multi-dimensional list or table of positional data as a function of velocity, altitude, azimuth angle, roll angle, elevation angle, latitude, longitude, weight, temperature, pressure, center of gravity, vehicle identifier, vehicle type, and/or antenna mounting location. Antenna positional data 30 may be captured using a variety of formats as known to those skilled in the art both now and in the future.

Antenna positional data 30 can be expressed in terms of adjustments to or offsets from a desired antenna position or can be expressed as an actual antenna position as a function of one or more situational parameter. Additionally, the desired antenna position may be represented as a location and/or an orientation in a coordinate reference system. Antenna positional data 30 may be defined for the location and/or the orientation of radar antenna 14 in the same or a different coordinate reference system. If defined in a different coordinate reference system, conversion to one coordinate reference system or the other or conversion to a common reference system generally is performed. For example, antenna positional data 30 may be measured as a function of the airspeed of the platform and captured as an absolute value or as an offset from a desired antenna position. As another example, antenna positional data 30 may be captured as a function of a flight phase instead of as a function of both airspeed and altitude.

Antenna adjustment system 10 further includes antenna adjustment application 32. Antenna adjustment application 32 performs operations associated with adjustment or correction of the position of radar antenna 14. The operations may be implemented using hardware, firmware, software, or any combination of these methods. With reference to the exemplary embodiment of FIG. 1, antenna adjustment application 32 is implemented in software stored in memory 26 and accessible by processor 18 for execution of the instructions that embody the operations of antenna adjustment application 32. Antenna adjustment application 32 may be written using one or more programming languages, assembly languages, scripting languages, etc.

A radar antenna 14 positional adjustment is determined by execution of the instructions of antenna adjustment application 32. The resulting antenna adjustment is provided to antenna control system 20 through processor 18. Antenna adjustment application 32 determines an estimate of a misalignment of the antenna boresight with respect to location and/or orientation and generates an adjustment to the antenna boresight to correct for the misalignment. The misalignment may refer to an estimate of the difference between a desired position (location/orientation) of the antenna boresight and the actual position (location/orientation) of the antenna boresight. The desired position may refer to the direction that optimizes the radar signal generated and received.

Figure 2:
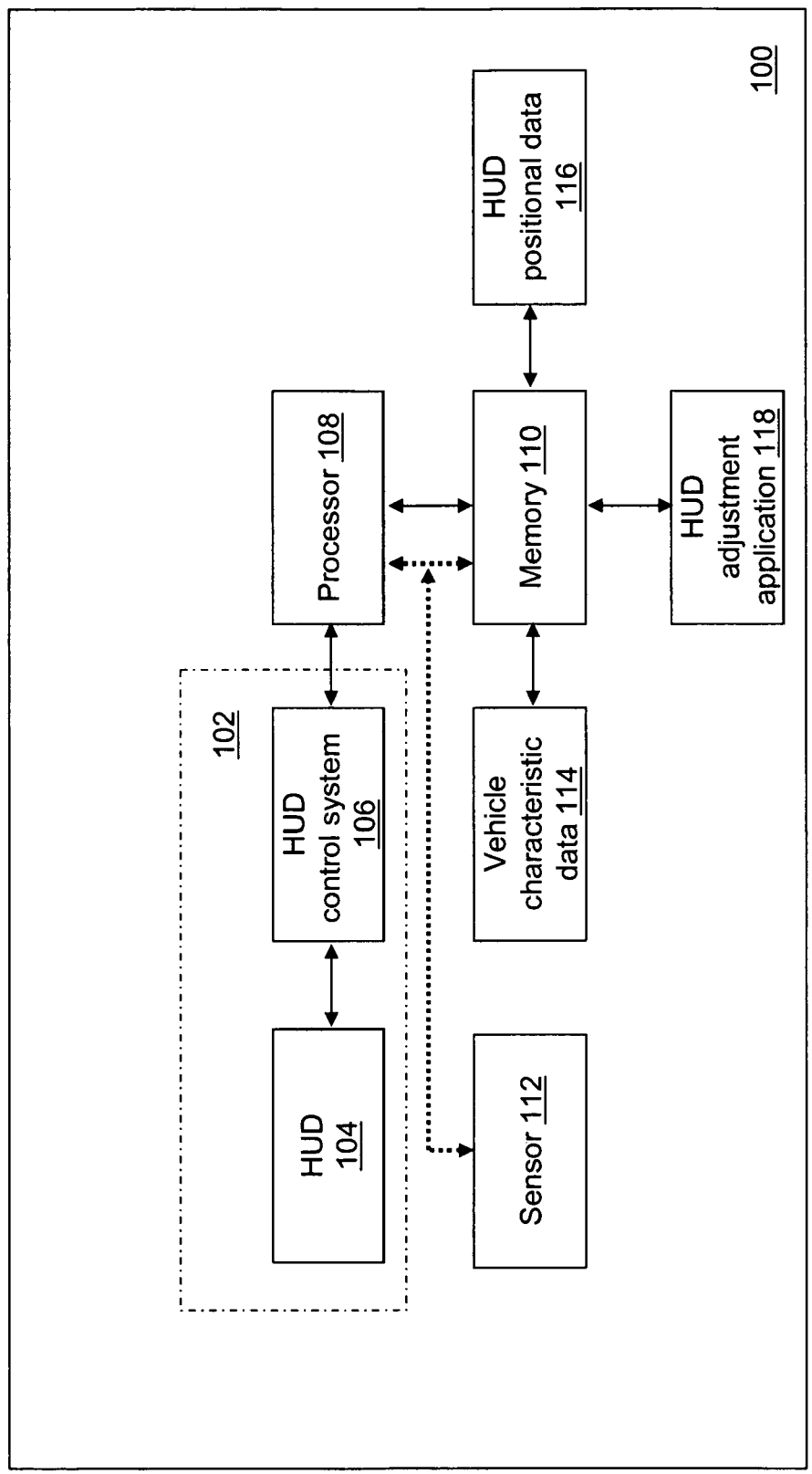
FIG. 2 is a block diagram of a heads-up display adjustment system in accordance with a second exemplary embodiment.

With reference to FIG. 2, a heads-up display (HUD) adjustment system 100 is shown in an exemplary embodiment. HUD adjustment system 100 may be mounted on an aerial vehicle such as an aircraft, or a satellite, or on any other moving platform. HUD adjustment system 100 includes a HUD system 102. HUD system 102 may include a HUD 104 and a HUD control system 106. HUD 104 may include one or more display that presents data without blocking the user's view through the display. For example, HUD 104 may include an optical system that superimposes a synthetic display on a pilot's field of view. HUD 104 may include an image source, collimating optics to project the image, and a combiner that projects an image in the field of view providing navigational, weapon-aiming information, etc. The image source may be a TFT display, a LED display, a LCD, a CRT display, etc. as known to those skilled in the art both now and in the future. HUD 104 determines the image to be presented based on the orientation of the vehicle.

HUD control system 106 controls the positioning of elements viewable on HUD 104. HUD control system 106 may be an electronic system or an electro-mechanical system without limitation. HUD control system 106 couples to processor 108 to control the position/orientation of HUD 104. In general, HUD 104 has a fixed mount, for example, in the cockpit of the aerial vehicle. Elevation queues align the pilot's view of the external world through HUD 104. The aircraft's vertical orientation, however, as reported by the aircraft's attitude reference system may not match the vertical orientation data needed for HUD control system 106 to determine and control presentation of a correct viewing angle through HUD 104. As a result, adjustments to HUD 104 may be needed to correct the viewing angle through HUD 104 that aligns the pilot's view of the outside world with vertical queuing symbology. As used herein, positional control of HUD 104 includes control of the location of HUD 104 and of the orientation of HUD 104 with respect to a coordinate reference system.

Processor 108 executes instructions. The instructions may be carried out by a special purpose computer, logic circuits, or hardware circuits. Thus, processor 108 may be implemented in hardware, firmware, software, or any combination of these methods. The term "execution" is the process of running an application or the carrying out of the operation called for by an instruction. The instructions may be written using one or more programming language, scripting language, assembly language, etc. It is understood that any type of processor that can be programmed to carry out the signal/data processing set forth herein may be utilized. HUD adjustment system 100 may include a plurality of processors that use the same or a different processing technology.

HUD adjustment system 100 may further include a memory 110 that, similar to memory 26, stores information for access by other elements of HUD adjustment system 100. HUD adjustment system 100 may further include a sensor 112 that, similar to sensor 24, senses, measures, and/or determines situational data related to situational parameters of the platform on which antenna adjustment system 10 is mounted. HUD adjustment system 100 may further include vehicle characteristic data 114 that, similar to vehicle characteristic data 28, characterizes the platform on which HUD adjustment system 100 is mounted.

HUD adjustment system 100 further includes HUD positional data 116 determined as a function of a situational parameter of the platform on which HUD adjustment system 100 is mounted. For example, HUD positional data 116 may be a single or multi-dimensional list or table of positional data as a function of velocity, altitude, azimuth angle, roll angle, elevation angle, latitude, longitude, weight, temperature, pressure, center of gravity, vehicle identifier, vehicle type, and/or antenna mounting location. HUD positional (location/orientation) data 116 may be captured using a variety of formats as known to those skilled in the art both now and in the future. HUD positional data 116 can be expressed in terms of adjustments or can be expressed as an actual location/orientation as a function of one or more situational parameter.

HUD adjustment system 100 further includes HUD adjustment application 118. HUD adjustment application 118 performs operations associated with adjustment or correction of the position (location/orientation) of HUD 104. The operations may be implemented using hardware, firmware, software, or any combination of these methods. With reference to the exemplary embodiment of FIG. 2, HUD adjustment application 118 is implemented in software stored in memory 110 and accessible by processor 108 for execution of the instructions that embody the operations of HUD adjustment application 118. HUD adjustment application 118 may be written using one or more programming languages, assembly languages, scripting languages, etc.

A positional adjustment of HUD 104 is determined by execution of the instructions of HUD adjustment application 118. The resulting adjustment is provided to HUD control system 106 through processor 108. HUD adjustment application 118 determines an estimate of a misalignment of the vertical orientation symbology of HUD 104 with respect to location and/or orientation and generates an adjustment to correct for the misalignment.

Figure 3:
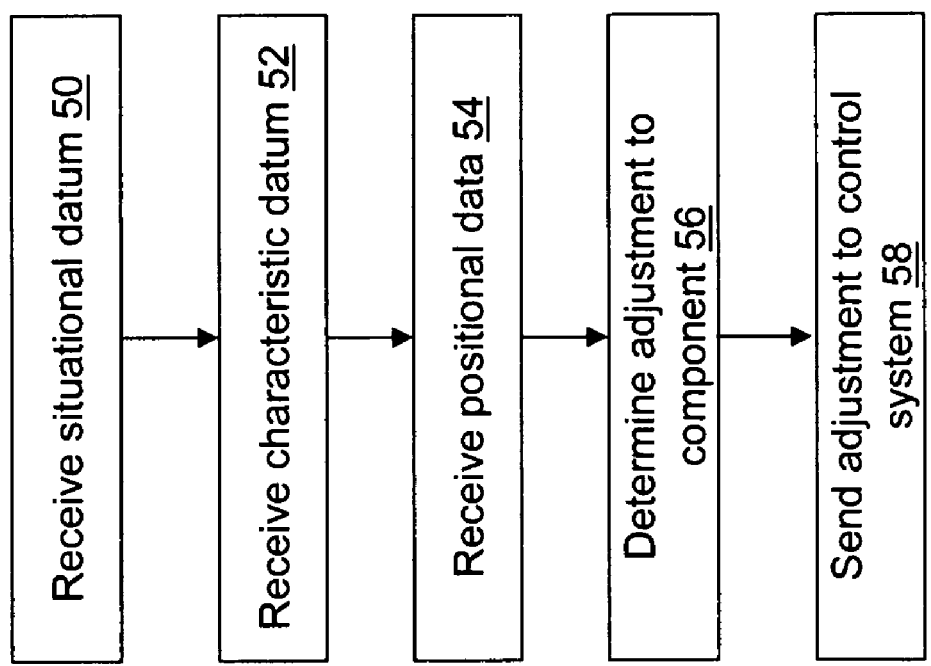
FIG. 3 is a flow diagram illustrating exemplary operations performed by an adjustment application in accordance with an exemplary embodiment.

With reference to FIG. 3, exemplary operations of an adjustment application are described. Antenna adjustment application 32 and HUD display adjustment application 118 are exemplary adjustment applications. Radar system 12 and HUD system 102 are exemplary adjustment systems. Additional, exemplary systems include, but are not limited to, an instrument landing system and a laser designation system. In an operation 50, the adjustment application receives a situational datum associated with a situational parameter from the sensor 24, 112, the processor 18, 108, and/or the memory 26, 110. The situational datum characterizes the situation associated with the platform on which the adjustment system is mounted. Exemplary situational parameters include velocity, altitude, azimuth angle, roll angle, elevation angle, latitude, longitude, weight, temperature, pressure, center of gravity, etc. In an operation 52, the adjustment application receives a characteristic datum associated with the platform on which the adjustment system is mounted. The characteristic datum may be captured in the vehicle characteristic data 28, 114 stored in memory 26, 110. Exemplary characteristic parameters include a vehicle identifier, a vehicle type, an antenna mounting location indicator, etc.

In an operation 54, the adjustment application receives some or all of the positional data 30, 116 stored in memory 26, 110. In an operation 56, the adjustment application determines an adjustment to the position of the component using the received situational datum, characteristic datum, and/or positional data. Exemplary components are a radar antenna 14 of radar system 12, a HUD 104 of HUD system 102, a laser of a laser designation system, and a receiver of an instrument landing system. As an example, determining the adjustment may include applying a mathematical function to the received positional data. For example, an interpolation function may be used to interpolate between data points of the received positional data using the received situational datum. The mathematical function may be based on a curve fit of the positional data based on one or more situational parameter as known to those skilled in the art. As another example, determining the adjustment may include determining a phase of flight and indexing into the positional data based on the determined phase of flight.

In an operation 58, the determined adjustment is sent to the control system 20, 106. The determined adjustment may be combined with other adjustment values calculated using different operations before sending to the control system. As an example, antenna adjustment application 32 may receive an adjustment from another source. Multiple adjustment sources may be independent, thus allowing for addition of the adjustments calculated based on each adjustment source. Multiple adjustment sources may not be independent, however, thus requiring use of vector operations calculated based on each adjustment source. The adjustment vectors may not be defined with respect to the same coordinate reference system, and thus, may require conversion to a common coordinate reference system before performing the vector operations.

As another example, antenna adjustment application 32 may send the determined adjustment to another application that determines an overall adjustment that is sent to antenna control system 20. For example, antenna adjustment application 32 may be used in combination with the antenna adjustment method described in U.S. patent application Ser. No. 11/153,972, titled ANTENNA ADJUSTMENT SYSTEM AND METHOD FOR AN AIRCRAFT WEATHER RADAR SYSTEM, filed on Jun. 16, 2005, and assigned to the Assignee of the present application, the entire disclosure of which is incorporated herein by reference in its entirety and for all purposes as if fully set forth herein. Thus, the adjustment determined using antenna adjustment application 32 may not be sent directly to antenna control system 20 or may incorporate additional adjustment data. Antenna control system 20 reorients or moves radar antenna 14 in response to the received overall adjustment.

The operations described with reference to FIG. 3, may be performed at initialization of the adjustment system, periodically, in pseudo real-time, and/or in real-time. For example, an adjustment may be determined at the end of a scan sequence, every two seconds, when the flight phase changes, etc. By continually executing the operations of FIG. 3, the adjustment application continuously responds to changes in the actual component position versus the desired component position to improve the performance of the system.

The elements of antenna adjustment system 10 may be integrated or separated according to particular needs. For example, the functions of processor 18 and memory 26 may be provided using a single component. If processor 18 and memory 26 are separated, processor 18 may be coupled to memory 26 using a bus or other suitable link. Memory 26 may be local to or remote from radar system 12. Similarly, the elements of HUD adjustment system 100 may be integrated or separated according to particular needs. For example, the functions of processor 108 and memory 110 may be provided using a single component. If processor 108 and memory 110 are separated, processor 108 may be coupled to memory 110 using a bus or other suitable link. Memory 110 may be local to or remote from HUD system 102.

In one embodiment, processor 18, memory 26, antenna adjustment application 32, antenna positional data 30, and vehicle characteristic data 28 can be integrated with the electronics associated with a weather radar system. In one preferred embodiment, the platform and software of a WXR-2100 weather radar system manufactured by Rockwell Collins, Inc. or an RDR 4000 weather radar system manufactured by Honeywell International can be configured to include the above-listed components. Additionally, signal generator/receiver 16 and antenna control system 20 can be integrated with components of the weather radar system.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, antenna adjustment system 10 may include fewer, additional, or different modules than described without deviating from the spirit of the invention. Similarly, HUD adjustment system 100 may include fewer, additional, or different modules than described without deviating from the spirit of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system mounted on an aerial vehicle, the system comprising:
   a component for mounting on the aerial vehicle;
   a control system operably coupled to the component to mechanically or electrically adjust a position of the component; and
   a processor operably coupled to the control system, the processor configured
      to receive a situational datum relating to the aerial vehicle;
      to select a positional datum from predetermined positional data of the component of the aerial vehicle stored in a memory, the positional datum selected using the received situational datum;
      to determine an adjustment to the position of the component using the selected positional datum; and
      to send the determined adjustment to the control system to adjust the position of the component.

2. The system of claim 1, wherein the position of the component is selected from an elevation angle, an azimuth angle, a roll angle, and a location.

3. The system of claim 1, wherein the component is selected from the group consisting of one or more antenna, one or more heads-up display, one or more receiver, and one or more laser.

4. The system of claim 1, wherein the processor is further configured to receive a characteristic datum relating to the vehicle.

5. The system of claim 4, wherein the characteristic datum is selected from the group consisting of a vehicle identifier, a vehicle type, and an antenna mounting location indicator.

6. The system of claim 4, wherein the processor is further configured to determine the adjustment to the position of the component using the received characteristic datum.

7. The system of claim 1, wherein the situational datum is selected from the group consisting of a velocity, an altitude, an azimuth angle, a roll angle, an elevation angle, a latitude, a longitude, a weight, a temperature, a pressure, a phase of flight of the vehicle, and a center of gravity.

8. The system of claim 1, wherein the adjustment is determined when the aerial vehicle is moving.

9. The system of claim 1, wherein determining the adjustment includes applying a mathematical function to the predetermined positional data.

10. The system of claim 9, wherein the mathematical function interpolates between data points of the predetermined positional data.

11. The system of claim 1, wherein the predetermined positional data are adjustment values.

12. The system of claim 1, wherein the adjustment is determined to initialize the position of the component.

13. The system of claim 1, wherein the situational datum is sensed by a sensor mounted on the vehicle.

14. The system of claim 1, wherein the component is a radar antenna.

15. The system of claim 14, wherein the processor is further configured to determine the adjustment to the position of the radar antenna using data related to a return received by the radar antenna and data related to an expected return.

16. A computer-readable medium having computer-readable instructions stored thereon that, upon execution by a processor, cause the processor to determine an adjusted position of a component of an aerial vehicle in response to a situational parameter, the instructions comprising:

receiving a situational datum relating to an aerial vehicle;

selecting a positional datum from predetermined positional data of a component of the aerial vehicle stored in a memory accessible by the processor, the positional datum selected using the received situational datum; and determining an adjustment to a position of the component using the selected positional datum.

17. The computer-readable medium of claim 16, wherein the instructions further comprise receiving a characteristic datum relating to the aerial vehicle, wherein determining the adjustment uses the received characteristic datum.

18. The computer-readable medium of claim 16, wherein the instructions further comprise sending the determined adjustment to a control system to adjust a position of the component.

19. The computer-readable medium of claim 18, wherein the instructions further comprise initializing the position of the component.

20. A method of adjusting a position of an aerial vehicle component in response to a situational parameter of the aerial vehicle, the method comprising:

receiving a situational datum relating to an aerial vehicle;

selecting a positional datum from predetermined positional data of a component of the aerial vehicle stored in a memory, the predetermined positional data defined as a function of a situational parameter of the vehicle, the situational datum related to the situational parameter; and determining an adjustment to a position of the component using the selected positional datum.

\* \* \* \* \*